(12) United States Patent
Liu

(10) Patent No.: US 12,250,205 B2
(45) Date of Patent: Mar. 11, 2025

(54) NETWORK CONNECTION ESTABLISHMENT METHOD AND ELECTRONIC DEVICE

(71) Applicant: Huawei Technologies Co., Ltd., Shenzhen (CN)

(72) Inventor: Zongqi Liu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/674,071

(22) Filed: Feb. 17, 2022

(65) Prior Publication Data
US 2022/0174054 A1    Jun. 2, 2022

Related U.S. Application Data

(63) Continuation of application No. PCT/CN2020/113003, filed on Sep. 2, 2020.

(30) Foreign Application Priority Data

Sep. 3, 2019  (CN) .......................... 201910827088.7

(51) Int. Cl.
*H04L 9/40* (2022.01)
*H04L 67/141* (2022.01)

(52) U.S. Cl.
CPC ............ *H04L 63/08* (2013.01); *H04L 63/061* (2013.01); *H04L 63/18* (2013.01); *H04L 67/141* (2013.01)

(58) Field of Classification Search
CPC ....... H04L 63/18; H04L 63/061; H04L 63/06; H04L 63/14
See application file for complete search history.

(56) References Cited

U.S. PATENT DOCUMENTS

| 9,210,162 B2* | 12/2015 | Wright ................ H04L 63/0823 |
| 10,237,070 B2 | 3/2019 | Lindemann |
| 2010/0132017 A1* | 5/2010 | Robinson ................ H04L 63/18 726/5 |
| 2013/0208894 A1 | 8/2013 | Bovino |

(Continued)

FOREIGN PATENT DOCUMENTS

| CN | 102916806 A | 2/2013 |
| CN | 103546289 A | 1/2014 |

(Continued)

OTHER PUBLICATIONS

ITU-T H.264, Jun. 2019, "Series H: Audiovisual and Multimedia Systems, Infrastructure of audiovisual services-Coding of moving video, Advanced video coding for generic audiovisual services," 836 pages.

*Primary Examiner* — Nam T Tran
(74) *Attorney, Agent, or Firm* — Conley Rose, P.C.

(57) ABSTRACT

Electronic apparatus and associated network connection establishment methods include after establishing a data channel with a second device, a first device periodically updates a session key, and sends a first session key to the second device through the data channel; the first device establishes a first network channel with the second device; and when a second session key is received within first preset duration through the first network channel, and the second session key is the same as the first session key, the first device sends response information to the second device through the first network channel.

20 Claims, 10 Drawing Sheets

(56) References Cited

U.S. PATENT DOCUMENTS

| | | | | |
|---|---|---|---|---|
| 2014/0245391 A1* | 8/2014 | Adenuga | ............... | H04L 63/08 |
| | | | | 726/3 |
| 2014/0289826 A1* | 9/2014 | Croome | ............... | H04L 63/18 |
| | | | | 726/5 |
| 2015/0304279 A1* | 10/2015 | Bui | ..................... | H04L 63/18 |
| | | | | 726/4 |
| 2018/0139228 A1* | 5/2018 | Kanakarajan | ........... | H04L 63/08 |
| 2018/0191501 A1 | 7/2018 | Lindemann | | |
| 2018/0349594 A1 | 12/2018 | Jung et al. | | |

FOREIGN PATENT DOCUMENTS

| | | | |
|---|---|---|---|
| CN | 105227305 | A | 1/2016 |
| CN | 107370751 | A | 11/2017 |
| CN | 108352988 | A | 7/2018 |
| CN | 109714297 | A | 5/2019 |
| CN | 109885511 | A | 6/2019 |
| CN | 109962781 | A | 7/2019 |
| EP | 0998080 | A2 | 5/2000 |
| EP | 2744175 | A1 | 6/2014 |

* cited by examiner

| Data flow direction | Request type | Value | Index | Transmission data length |
|---|---|---|---|---|

NETWORK CONNECTION ESTABLISHMENT METHOD AND ELECTRONIC DEVICE

CROSS-REFERENCE TO RELATED APPLICATIONS

This is a continuation of International Patent Application No. PCT/CN2020/113003 filed on Sep. 2, 2020, which claims priority to Chinese Patent Application No. 201910827088.7 filed on Sep. 3, 2019. The disclosures of the aforementioned applications are hereby incorporated by reference in their entireties.

TECHNICAL FIELD

This disclosure relates to the field of communications technologies, and in particular, to a network connection establishment method and an electronic device.

BACKGROUND

A socket is a connection endpoint of a device and is defined based on an Internet Protocol (IP) address and a port. A corresponding device can use the socket to establish an end-to-end network connection with another device. For example, a socket is disposed on a server end, and a client may learn of the socket of the server end. Further, an application (APP) of the client may invoke a socket of the client to establish a network connection with the socket of the server end.

It can be learned that if the client learns of the socket of the server end, any APP of the client may establish a network connection with the server end, so that a mechanism for establishing a network connection by using the socket has a relatively high security risk.

SUMMARY

This disclosure provides a network connection establishment method and an electronic device, so as to improve security of a mechanism for establishing a network channel.

According to a first aspect, this disclosure provides a network connection establishment method, where the method includes that a first device establishes a data channel with a second device, the first device updates a session key based on a preset period, the first device receives an obtaining request from the second device through the data channel, the first device sends, in response to the obtaining request, a first session key to the second device through the data channel, where the first session key is a latest session key when the first device receives the obtaining request, the first device establishes a first network channel with the second device, if receiving a second session key through the first network channel within first preset duration, the first device detects whether the second session key is the same as the first session key, and if the second session key is the same as the first session key, the first device sends response information to the second device through the first network channel, where the response information is information used by the first device to respond to a request sent by the second device through the first network channel.

In this disclosure, a physical port for the first network channel is the same as a physical port for the data channel, and the first network channel may be a network channel carried on the data channel. The data channel is used to transmit service data, for example, video data, according to a data transmission protocol. The first network channel is used to transmit a file. The file is related to the service data transmitted on the data channel, for example, an operation and maintenance file of a video player. In addition, a session key is used to verify a network channel. Based on this, the first device periodically updates the session key, so that reliability of the session key can be ensured. Further, security of the data channel is relatively high, and the first device sends the session key to the second device through the data channel, so that security of the session key can be further ensured. Further, the first device authenticates a network channel by detecting whether a session key transmitted on the network channel is the same as a pre-generated session key, so that security of a mechanism for establishing the network channel can be improved.

In a possible implementation, after that the first device establishes a first network channel with the second device, the method further includes if skipping receiving the second session key through the first network channel within the first preset duration, the first device closes the first network channel. For example, to make a normal APP in the second device unable to establish a network connection, an attacker continuously establishes a network connection with the first device, so as to occupy a network port of the first device all the time. This attack is referred to as a "dos attack" in this disclosure. Because a malicious program that initiates the "dos attack" cannot provide a session key used for authentication, in this implementation, the first device can determine, based on whether the second session key is received, whether the first network channel is a channel through which the dos attack is performed.

In a possible implementation, after that the first device detects whether the second session key is the same as the first session key, the method further includes if the second session key is different from the first session key, the first device closes the first network channel after second preset duration. For example, if the attacker has learned a length of the first session key, the attacker may continuously establish a network channel with the first device by using a malicious program, and determine a character string that meets the length of the first session key as a session key of each network channel. For example, the attacker may sequentially determine the session key of each network channel in ascending order, to crack the first session key. This attack is referred to as brute force cracking in this disclosure. Based on this, in this implementation, the first device can determine, in a scenario in which the second session key is different from the first session key, that the first network channel is a network channel of the brute force cracking.

In a possible implementation, after that the first device establishes a first network channel with the second device, the method further includes that the first device sets a first channel identifier, where the first channel identifier is used to identify the first network channel, the first device adds the first channel identifier to an unauthentication list, and records a first addition moment, where the unauthentication list is used to store a channel identifier of an unauthenticated network channel, and the first device detects whether the second session key is received within the first preset duration for which the first addition moment is used as a start moment. In this implementation, after establishing the network channel, the first device adds the channel identifier of the network channel to the unauthentication list, to detect whether the network channel is available. In this way, security of establishing a network connection mechanism can be improved, and the first device and the second device can be allowed to continue to establish another network connection.

In a possible implementation, if the second session key is different from the first session key, the first device closes the first network channel after second preset duration includes if the second session key is different from the first session key, the first device adds the first channel identifier to an authentication failure list, and records a second addition moment, where the authentication failure list is used to store a channel identifier of a network channel that fails to be authenticated, and if duration for which the second addition moment is used as a start moment reaches the second preset duration, the first device closes the first network channel. In this embodiment, the authentication failure list is set. After the authentication of the first network channel fails, the first device may maintain the first channel identifier in the authentication failure list for a period of time, so that the connection of the first network channel can be closed for a period of time after the authentication of the first network channel fails. This increases attack costs of brute force cracking. In addition, in this disclosure, the first network channel generates a new session key at an interval of time, so that a probability of successful brute force cracking can be further reduced.

In a possible implementation, after that the first device receives an obtaining request from the second device, the method further includes that the first device obtains an index (wIndex) field and a value (wValue) field that are in a packet of the obtaining request, where the wIndex field includes an entity identifier (EntityID) byte, and the first device determines, based on a value of the EntityID byte and a value in the wValue field, that the obtaining request is used to obtain a session key. The data channel transmits data according to a data transmission protocol, for example, a Universal Serial Bus (USB) Video Class (UVC) protocol. The data channel and the data transmission protocol have security. Therefore, in this disclosure, a function of obtaining an authentication key may be defined in a manner of extending the data transmission protocol, so as to ensure reliability of the authentication key.

In a possible implementation, after that the first device adds the first channel identifier to an unauthentication list, the method further includes that the first device establishes a second network channel with the second device. In this implementation, the first device and the second device can establish a plurality of network channels based on a same port, and the first device may simultaneously perform authentication operations on the established network channels by using a plurality of threads. Compared with technology in which a single thread is used to authenticate one network channel, this can greatly shorten duration of identifying a normal network channel. If a dos attack exists, the first device can further shorten dos attack duration.

According to a second aspect, this disclosure provides an electronic device. The electronic device has a function of implementing the method of the first device. The function may be implemented by hardware, or may be implemented by hardware executing corresponding software. The hardware or the software includes one or more modules corresponding to the foregoing function. In a possible design, a structure of the electronic device includes a processor and a transceiver. The processor is configured to process the first device to perform a corresponding function in the foregoing method. The transceiver is configured to establish a channel and send and receive data and information. The electronic device may further include a memory. The memory is configured to be coupled to the processor, and the memory stores program instructions and data that are necessary for the electronic device.

According to a third aspect, this disclosure provides a non-volatile computer storage medium. The computer storage medium stores instructions. When the instructions are run on a computer, the computer is enabled to perform some or all of the steps of the network connection establishment method in the first aspect and the possible implementations of the first aspect.

According to a fourth aspect, this disclosure provides a computer program product. When the computer program product runs on a computer, the computer is enabled to perform some or all of the steps of the network connection establishment method in the first aspect and the possible implementations of the first aspect.

In this disclosure, after the first device establishes the data channel with the second device, the first device periodically updates the session key, and after receiving the obtaining request from the second device, the first device sends the first session key to the second device through the data channel. After the first device establishes the first network channel with the second device, the first device may detect whether the second session key is received through the first network channel within the first preset duration. If the second session key is received through the first network channel within the first preset duration, the first device may detect whether the second session key is the same as the first session key. If the second session key is the same as the first session key, authentication on the first network channel succeeds. The first device sends the response information to the second device through the first network channel. It can be learned that the first device periodically updates the session key, and sends the session key to the second device through the data channel, so that reliability of the session key used for authentication can be ensured. Further, the first device authenticates a network channel by detecting whether a session key transmitted on the network channel is the same as the pre-generated session key, and transmits information through the network channel after authentication succeeds, so that security of a mechanism for establishing the network channel can be improved. In addition, the first device can increase attack costs by delaying a time for closing a network channel through which an attack is performed, and further shorten a time for successfully authenticating and using a network channel for a normal app.

DESCRIPTION OF EMBODIMENTS

The following clearly describes the technical solutions in this disclosure with reference to the accompanying drawings.

Terms used in the following embodiments of this disclosure are merely for the purpose of describing specific embodiments, but are not intended to limit this disclosure. The singular expressions "one", "one type of", "the", "the foregoing", and "this" used in this specification and the appended claims of this disclosure are also intended to include plural forms, unless otherwise specified in the context clearly. It should also be understood that although the terms first, second, and the like may be used to describe a class of objects in the following embodiments, the objects should not be limited to these terms. These terms are used only to distinguish between specific objects of this class of objects. For example, in the following embodiments, the terms first, second, and the like may be used to describe a network channel, but the network channels should not be limited to these terms. These terms are merely used to distinguish between different network channels. The same principle applies to other classes of objects that may be described by using the terms first, second, and the like in the following embodiments, and details are not described herein again.

The following describes an implementation scenario of this disclosure.

Figure 1:
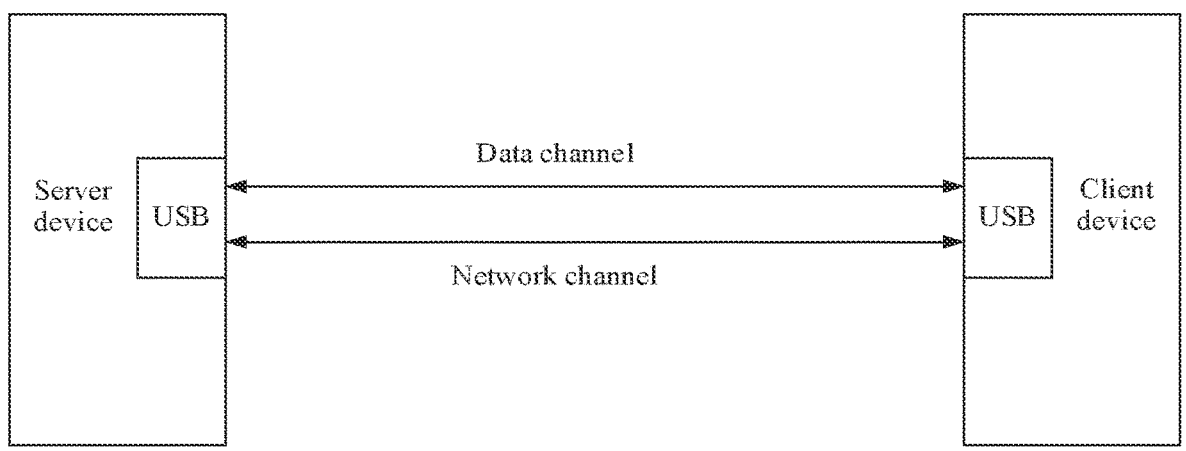
FIG. 1 is a schematic diagram of an example of an implementation scenario according to this disclosure.

As shown in FIG. 1, this disclosure relates to a first device and a second device. The first device establishes a connection with the second device based on a USB interface. The first device and the second device may establish a data channel and a network channel based on the USB interface. The first device may send service data to the second device through the data channel. The first device may send a file related to the service data, for example, an alarm file, and an operation and maintenance file and an upgrade file of an APP that processes the service data to the second device through the network channel. The data channel supports a transmission protocol corresponding to the service data, and the network channel supports a Transmission Control Protocol (TCP) and an IP.

The first device may be an electronic device that has a data transmission function. For example, the first device may be an electronic device that includes but is not limited to an iOS®, Android®, Microsoft®, or another operating system, such as a smartphone, a tablet computer, a camera, a monitoring device, or a vehicle-mounted device.

The second device may be a display device that has an audio and video playing function and/or a video and image display function, such as a display, a smart television (TV), a smartphone, a tablet computer, an augmented reality (AR) device, or a vehicle-mounted device.

In actual use, the data channel is usually only used to transmit service data. Therefore, to transmit a file related to the service data, the first device and the second device may establish a network channel based on the USB interface. The network channel supports the Remote Network Driver Interface Specification (RNDIS). Implementation of the RNDIS based on USB essentially means TCP/IP over USB, that is, a network connection is established based on the USB interface. For example, a common manner of establishing a network connection is establishing a network connection by using a socket. However, there is no mechanism for authenticating the manner of establishing the network connection by using the socket and any application that can scan a socket of the first device can initiate a connection to the first device. As a result, there are relatively high security risks during establishment of a network connection and transmission of information through a network channel.

This disclosure provides a network connection establishment method and an electronic device. After a network channel is formed between a server and a client, the server authenticates the corresponding network channel. After authentication on the network channel succeeds, the server responds to a request sent by the client through the network channel. If authentication on the network channel fails, the server disconnects from the corresponding network channel. In this way, security during establishment of a network connection can be improved.

Example devices are first described in the following embodiments of this disclosure.

Figure 2A:
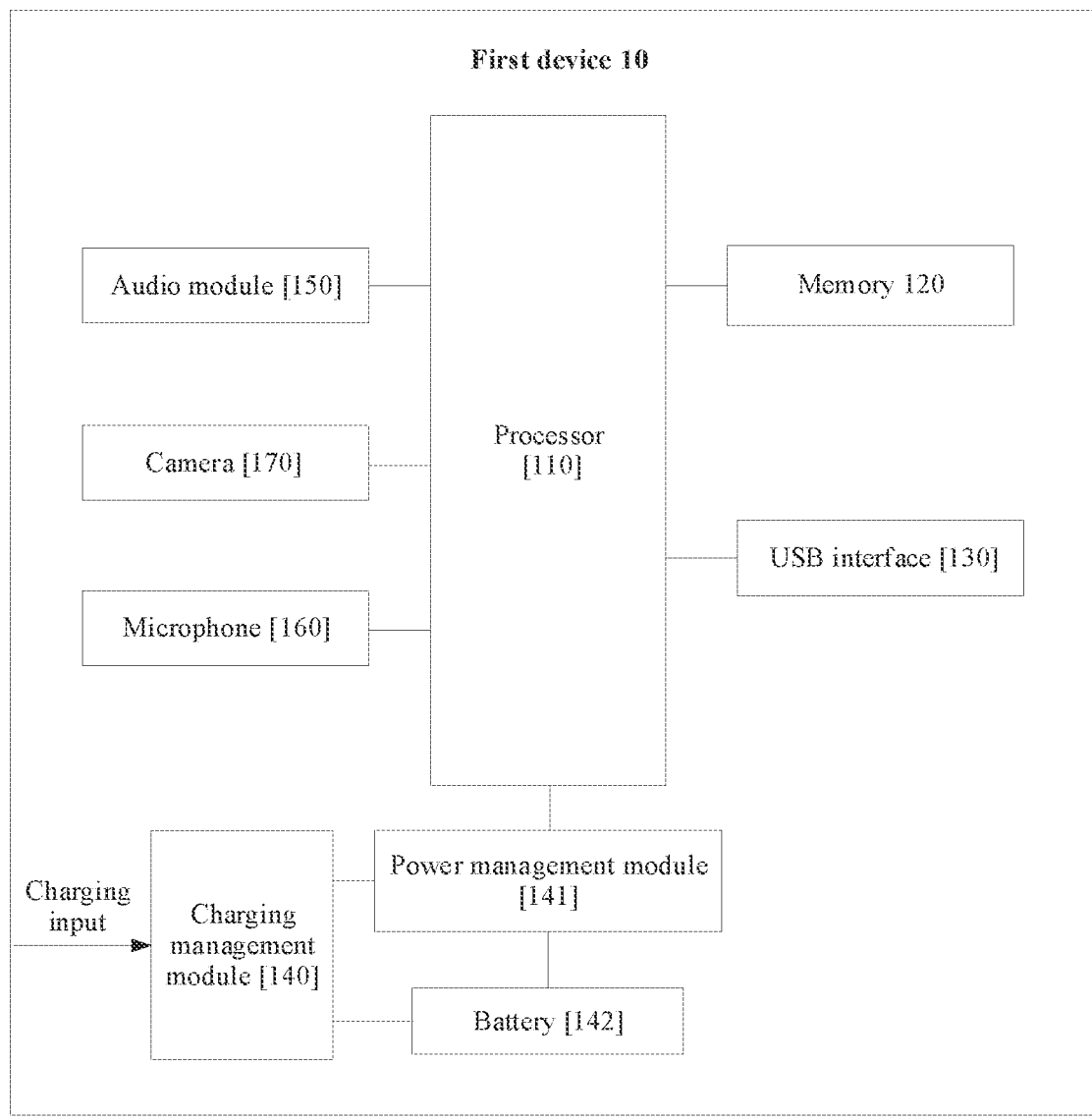
FIG. 2A is an architectural diagram of an example of a first device according to this disclosure.

FIG. 2A shows a schematic diagram of an example architecture of a first device 10.

The first device 10 may include a processor 110, a memory 120, a USB port 130, a charging management module 140, a power management module 141, a battery 142, an audio module 150, a microphone 160, a camera 170, and the like.

It can be understood that the structure shown in this embodiment does not constitute a specific limitation on the first device 10. In some other embodiments, the first device 10 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), and/or a neural-network processing unit (NPU). Different processing units may be independent components, or may be integrated into one or more processors. In some embodiments, the first device 10 may alternatively include one or more processors 110.

The controller may be a nerve center and a command center of the first device 10. The controller may generate an operation control signal based on instruction operation code and a time sequence signal, and perform control of generating a session key, an authentication operation, and the like.

In some embodiments, the processor 110 may include one or more interfaces. The interface may include an Inter-Integrated Circuit Sound (I2S) interface, a Mobile Industry Processor Interface (MIPI), and/or a general-purpose input/output (GPIO) interface, and the like.

The I2S interface may be configured to perform audio communication. In some embodiments, the processor 110 may include a plurality of groups of I2S buses. The processor 110 may be coupled to the audio module 150 through the I2S bus, to implement communication between the processor 110 and the audio module 150.

The MIPI interface may be configured to connect the processor 110 to a peripheral component, for example, the camera 170. The MIPI interface includes a camera serial interface (CSI), and the like. In some embodiments, the processor 110 communicates with the camera 170 through the CSI interface, to implement a photographing function of the first device 10.

The GPIO interface may be configured through software. The GPIO interface may be configured as a control signal or a data signal. In some embodiments, the GPIO interface may be configured to connect the processor 110 to the camera 170, the audio module 150, and the like.

It can be understood that an interface connection relationship between the modules illustrated in this embodiment is merely an example for description, and does not constitute a limitation on the structure of the first device 10. In some other embodiments, the first device 10 may alternatively use an interface connection manner different from that in the foregoing embodiment, or a combination of a plurality of interface connection manners.

The memory 120 may be configured to store one or more computer programs, and the one or more computer programs include instructions. The processor 110 may run the foregoing instructions stored in the memory 120, so that the first device 10 performs the network connection establishment method, various functional applications, data processing, and the like that are provided in some embodiments of this disclosure. The memory 120 may include a program storage area and a data storage area. The program storage area may store an operating system. The program storage area may further store one or more to-be-executed operation instructions (for example, an instruction for authenticating a network connection request, and an operation instruction for timing), and the like. The data storage area may store data (for example, a session key or a handle that fails to be authenticated) created in a process of using the first device 10. In addition, the memory 120 may include a high-speed random-access memory (RAM), and may also include a non-volatile memory, for example, at least one magnetic disk storage device, a flash memory device, or a Universal Flash Storage (UFS), and the like.

The USB interface 130 is an interface that conforms to a USB standard specification, and may be a mini USB interface, a micro USB interface, a USB Type-C interface, or the like. The USB interface 130 may be configured to connect to a charger for charging the first device 10, may be configured to transmit data between the first device 10 and a peripheral device, and or may be configured to connect to a headset to play audio by using the headset. The interface may be further configured to connect to another electronic device, for example, a second device 20. In some embodiments, the USB interface 130 may be disposed in the processor 110.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the first device 10. The charging management module 140 may further supply power to the electronic device by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the memory 120, the camera 170, and the like. In some other embodiments, the power management module 141 may alternatively be disposed in the processor 110. In some other embodiments, the power management module 141 and the charging management module 140 may alternatively be disposed in a same device.

The first device 10 may implement a shooting function by using an ISP, a camera 170, a video codec, a GPU, an application processor, and the like.

The ISP is configured to process data fed back by the camera 170. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 170.

The camera 170 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the first device 10 may include one or N cameras 170, where N is a positive integer greater than one.

The first device 10 may implement an audio function, such as recording, by using an audio module 150, a microphone 160, an application processor, and the like.

The audio module 150 is configured to convert digital audio information into an analog audio signal output, and is also configured to convert an analog audio input into a digital audio signal. The audio module 150 may be further configured to code and decode an audio signal. In some embodiments, the audio module 150 may be disposed in the processor 110, or some function modules of the audio module 150 are disposed in the processor 110.

The microphone 160, also referred to as a "mike" or a "mic", is configured to convert a sound signal into an electrical signal. When collecting an audio information, the user may speak by approaching the microphone 160, to input a sound signal to the microphone 160. At least one microphone 160 may be disposed in the first device 10. In some other embodiments, two microphones 160 may be disposed in the first device 10, to collect a sound signal and implement a noise reduction function. In some other embodiments, three, four, or more microphones 160 may alternatively be disposed in the first device 10, to collect a sound signal, implement noise reduction, and identify a sound source, so as to implement a directional recording function and the like.

Figure 2B:
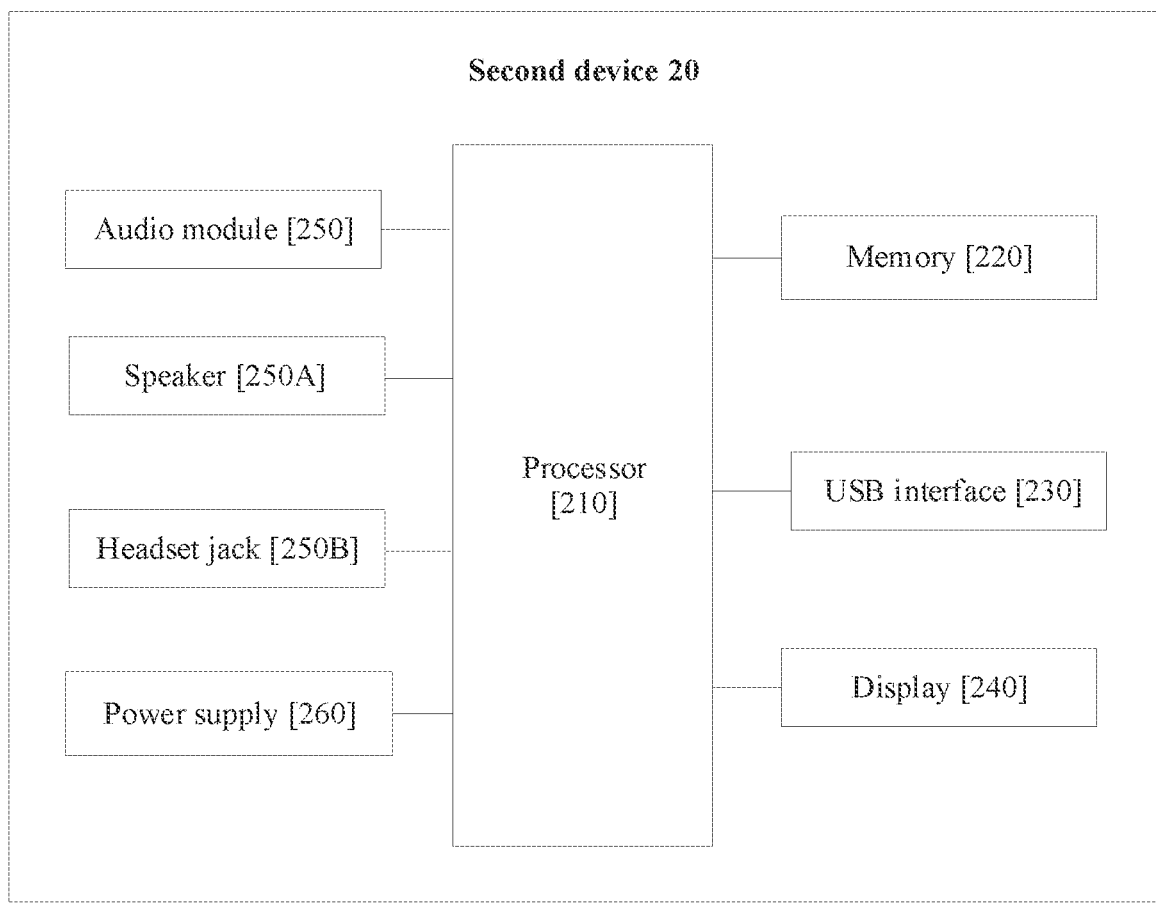
FIG. 2B is an architectural diagram of a second device according to this disclosure.

FIG. 2B shows a schematic diagram of an example architecture of a second device 20.

The second device 20 may include a processor 210, a memory 220, a USB interface 230, a display 240, an audio module 250, a speaker 250A, a headset interface 250B, a power supply 260, and the like.

It can be understood that the structure shown in this embodiment of this disclosure does not constitute a specific limitation on the second device 20. In some other embodiments of this disclosure, the second device 20 may include more or fewer components than those shown in the figure, or combine some components, or split some components, or have different component arrangements. The components shown in the figure may be implemented by hardware, software, or a combination of software and hardware.

In this embodiment, hardware and software included in the processor 210 and functions of the hardware and software are similar to those of the processor 110. A function of the audio module 250 is similar to that of the audio module 150. Details are not described herein again in this disclosure.

The memory 220 may be configured to store one or more computer programs, and the one or more computer programs include instructions. The processor 210 may run the foregoing instructions stored in the memory 220, so that the second device 20 performs the network connection establishment method provided in some embodiments of this disclosure, and the like. The memory 220 may be further configured to store data and a file that are received from the first device 10, for example, a session key and audio/video data that are received from the first device 10.

The USB interface 230 may be configured to connect to the first device 10, and transmit information and data with the first device 10.

The display 240 is configured to display controls, information, images, videos, and the like. The display 240 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, quantum dot LED (QLED), or the like.

The speaker 250A, also referred to as a "horn", is configured to convert an audio electrical signal into a sound signal. The second device 20 may play music through a speaker 170A.

The headset jack 250B is configured to connect to a wired headset. The headset jack 250B may be a 3.5 mm open mobile electronic device platform (OMTP) standard interface or a cellular telecommunications industry association of the United States of America (USA) (CTIA) standard interface.

The power supply 260 may be configured to supply power to the processor 210, the memory 220, the display 240, and the like.

The first device 10 shown as an example in FIG. 2A and the second device 20 shown as an example in FIG. 2B are two devices for establishing a network connection. Each device provides hardware and software that are used to implement the embodiments of establishing a network connection in this application, for example, the processor 110 for generating a session key and performing authentication.

The following describes a network connection establishment method in this disclosure with reference to the first device 10 and the second device 20.

In this embodiment of this disclosure, two channels are included between the first device 10 and the second device 20. The two channels are connected to the first device 10 through a physical interface on the first device 10 side and connected to the second device 20 through a physical interface on the second device 20 side. The two channels include a data channel and a network channel. The data channel is, for example, a USB channel, and the network channel is, for example, a socket channel. The data channel is used to transmit service data according to a data transmission protocol. For example, the first device 10 transmits video data to the second device 20 according to a UVC protocol. The network channel is used to transmit, according to a network communications protocol, a file related to the service data. For example, the first device 10 transmits an upgrade file of a video player to the second device 20 according to a TCP/IP protocol.

Figure 3:
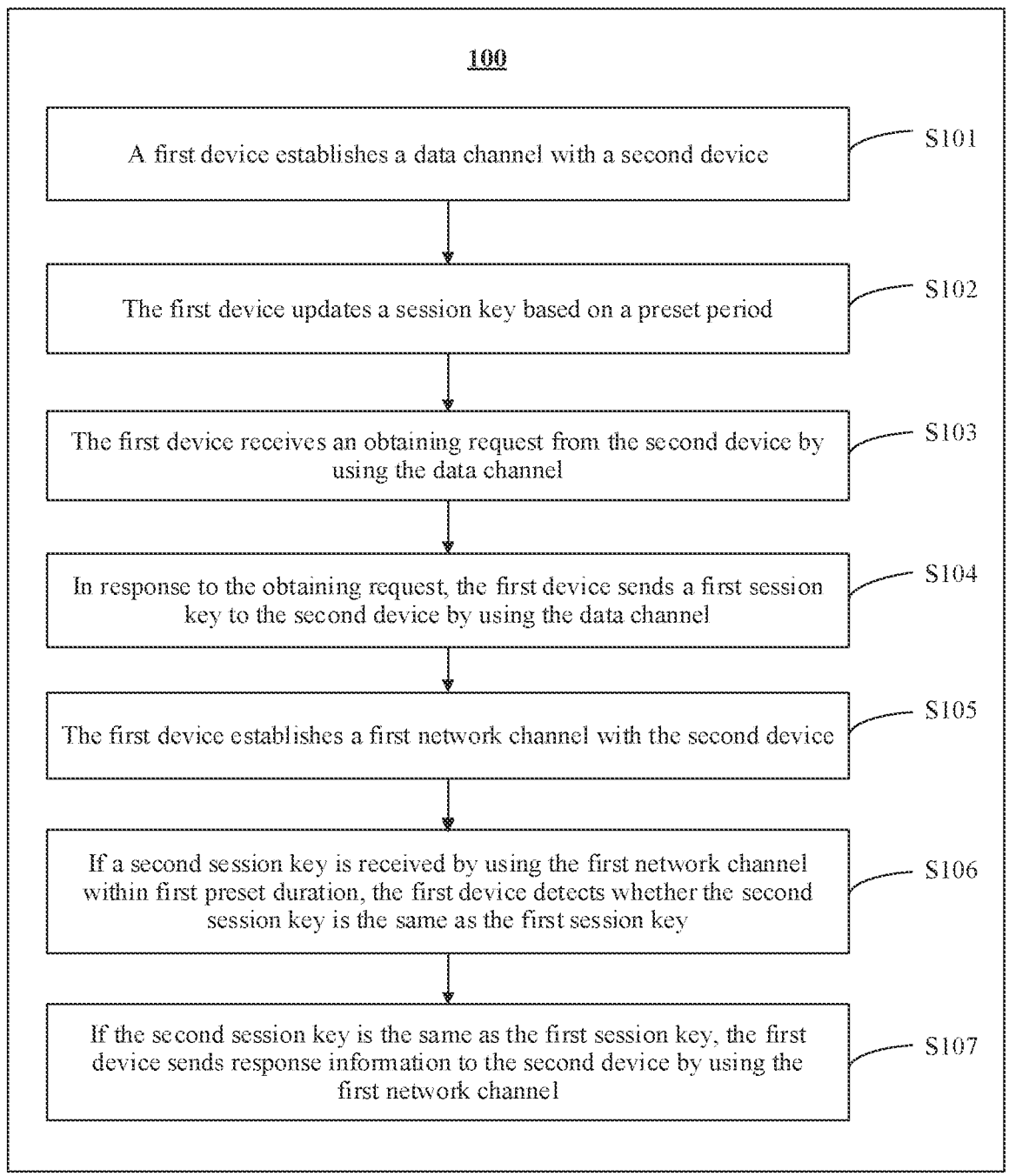
FIG. 3 is a flowchart of an example of a network connection establishment method according to this disclosure.

Based on this, FIG. 3 is a flowchart of a network connection establishment method 100. The network connection establishment method 100 (referred to as the method 100 below) includes the following steps.

Step S101: A first device establishes a data channel with a second device.

The first device is the first device 10 described in the foregoing embodiment, and the second device is the second device 20 described in the foregoing embodiment.

The data channel is, for example, a physical channel between the first device 10 and the second device 20. For example, the data channel may be a USB channel formed by connecting the USB interface 130 of the first device 10 to the USB interface 230 of the second device 20. The data channel is, for example, used to transmit video data. In this embodiment, the data channel supports a UVC protocol.

Step S102: The first device updates a session key based on a preset period.

The session key is used to authenticate a network channel. To improve security, the first device may update the session key based on the preset period. The preset period is, for example, 5 minutes.

With reference to FIG. 2A, for example, the processor 110 may generate a character string of a preset length according to any general-purpose random algorithm, and the character string is the session key. The processor 110 may generate the session key, for example, by using a hash algorithm. A session key generated by the processor 110 in each period is different from a session key generated in a previous period. In this way, the session key is dynamically updated. The preset length is, for example, 8 bytes.

In some embodiments, after generating the session key, the processor 110 may store the generated session key in the memory 120. After the preset period, the processor 110 generates a new session key, stores the new session key in the memory 120, and deletes a previously generated session key.

Step S103: The first device receives an obtaining request from the second device through the data channel.

The obtaining request is used by the second device to obtain a session key.

For example, a data packet of the obtaining request may include a field for indicating to obtain the session key, and the field may be preset by a related person. The field is, for example, an extensible field in the data packet of the obtaining request.

Step S104: In response to the obtaining request, the first device sends a first session key to the second device through the data channel.

The first session key is a latest session key on the first device side when the first device receives the obtaining request.

In actual implementation, the data channel is a physical channel, and the second device may set a permission, a process whitelist, or the like for the data channel. It can be learned that security of the data channel is relatively high. Based on this, the first device sends the session key to the second device through the data channel. This can further ensure security of the session key.

Step S105: The first device establishes a first network channel with the second device.

The first network channel is used to transmit a file, and the file is related to service data transmitted on the data channel. For example, the first network channel is used to transmit an operation and maintenance file, an upgrade file, and the like of a video player. The first network channel supports an RNDIS protocol. The first network channel is, for example, a socket channel.

In this disclosure, a physical port for the first network channel is the same as a physical port for the data channel, and the first network channel may be a network channel carried on the data channel.

Step S106: if receiving a second session key through the first network channel within first preset duration, the first device detects whether the second session key is the same as the first session key.

The first preset duration may be flexibly set. The first preset duration may be, for example, 5 minutes or 6 minutes.

In actual use, the first network channel may be obtained by a normal APP through connection, or may be obtained by a first malicious program through connection. In this embodiment, the normal APP is an APP that establishes a communication channel with the first device to implement a data and file transfer service, and the first malicious program may be an attack computer program, or a functional module that runs an attack computer program, for example, an APP, a Trojan horse, or a virus that is on the second device and that does not have permission to invoke the first device.

It can be learned from the foregoing description of the data channel that, after establishing a data channel with the first device, the normal APP may obtain a session key from the first device in advance through the data channel. However, the first malicious program may occupy a network connection port of the first device only for continuously establishing network connections with the first device. In this case, the normal APP cannot establish a network connection with the first device. Therefore, if the first network channel is obtained by the first malicious program through connection, the first malicious program cannot provide a session key used for authentication, and correspondingly, the first device cannot receive the second session key through the first network channel. An attack behavior of the first malicious program may usually be referred to as a denial-of-service (DoS) attack, which is directly referred to as a "DoS attack" in a related part below in this disclosure.

Based on this, in this disclosure, the first device detects whether the second session key is received through the first network channel within the first preset duration, and if the second session key is received through the first network channel within the first preset duration, step S107 is performed. If the second session key is not received through the first network channel within the first preset duration, the first device may determine that the first network channel is a channel through which the first malicious program performs a dos attack, and the first device may close the first network channel.

In addition, after step S105 and before step S106, the first device may further establish a second network channel, and the first device may perform an operation similar to that in the method 100 on the second network channel. In other words, the first device may perform an operation process of establishing and authenticating the second network channel and an operation process of step S107 at the same time. By analogy, the first device may establish a preset quantity of network channels with the second device based on one interface, and may further perform authentication operations on the preset quantity of network channels at the same time. The preset quantity is, for example, 100. This is not limited in this disclosure.

For example, in this step, the processor 110 may set a first channel identifier corresponding to the first network channel, then add the first channel identifier to an unauthentication list, and record a moment at which the first channel identifier is added to the unauthentication list, to obtain a first addition moment. The processor 110 may use the first addition moment as a start moment to record whether the second session key is received through the first network channel within the first preset duration. After adding the first channel identifier to the unauthentication list, the processor 110 may establish the second network channel with the second device.

The first channel identifier is used to identify the first network channel. The first channel identifier may be a handle generated by the processor 110 based on the first network channel. The handle may be described as an identifier. The identifier is used to identify an object or a project. The object or the project may be, for example, a module, a task, an instance, a block of memory, a control, a file, or a resource. The unauthentication list is used to maintain a channel identifier of an unauthenticated network channel.

Usually, after establishing a network channel, the processor 110 waits to authenticate the established network channel. After authentication on the network channel fails, the processor 110 closes the network channel. Then, the processor 110 receives an authentication request of a next network channel. To be specific, the processor 110 processes, by using one thread, a plurality of network channels corresponding to the dos attack. Consequently, a network channel for the normal APP can be authenticated and used only after a long time. In this implementation, the processor 110 can authenticate the plurality of network channels at the same time. This can greatly shorten waiting duration for authentication and use of the network channel for the normal APP, and can greatly shorten dos attack duration.

Further, in some embodiments, the second session key may be obtained by the second device from the first device. For a scenario in which the second device obtains the session key from the first device, refer to the description in the foregoing embodiment. Details are not described herein again. In this embodiment, the second session key is the same as the first session key. In some other embodiments, the second session key may be determined by a second malicious program based on a length of the first session key. The second malicious program may be an attack computer program, or a functional module that runs an attack computer program, for example, an APP, a Trojan horse, or a virus that is on the second device and that does not have permission to invoke the first device. For example, the second malicious program has learned of the length of the first session key. Then, the second malicious program may continuously establish network channels with the first device, and determine a character string that has the length of the first session key as a session key for each network channel. For example, the second malicious program may sequentially determine the session key of each network channel in ascending order, to crack the first session key.

Therefore, the second session key determined by the second malicious program is usually different from the first session key.

Based on this, the processor 110 may authenticate availability of the first network channel by detecting whether the second session key is the same as the first session key. If the second session key is the same as the first session key, the first network channel is a normal channel and is available. If the second session key is different from the first session key, the first network channel is established by a malicious program, and is unavailable. Further, the processor 110 may process the first network channel based on an authentication result.

Step S107: If the second session key is the same as the first session key, the first device sends response information to the second device through the first network channel.

The response information is information used by the first device to respond to any request sent by the second device through the first network channel.

It can be learned from the foregoing description of the second session key that, if the second session key is the same as the first session key, it indicates that the first network channel is a network channel initiated and established by the normal APP, and the first device may use the first network channel to transmit information to the second device.

It can be learned that, in this implementation, the first device transmits the pre-generated session key to the normal APP through the data channel, so that reliability of the pre-generated session key can be ensured. Then, the first device authenticates a network channel by detecting whether a session key transmitted on the network channel is the same as the pre-generated session key, and transmits information through the network channel after authentication succeeds, so that security of a mechanism for establishing the network channel can be improved.

Correspondingly, if the second session key is different from the first session key, it indicates that the first network channel is a network channel established by the second malicious program after brute force cracking of the session key. In this case, the first device may close the connection of the first network channel after second preset duration. The second preset duration may be flexibly set, and the second preset duration is, for example, 10 minutes.

For example, with reference to the description in step S106, in this step, if the second session key is different from the first session key, the processor 110 may add the first channel identifier to an authentication failure list, and record a moment at which the first channel identifier is added to the authentication failure list, to obtain a second addition moment. Then, the processor 110 may use the second addition moment as a start moment to record authentication failure duration. The authentication failure list is used to maintain a channel identifier of a network channel that fails to be authenticated.

A principle for brute force cracking of the session key by the second malicious program is that the second malicious program uses different character strings for authentication. In this implementation, a corresponding channel is closed only after a period of time after authentication based on each character string fails. Therefore, time costs of brute force cracking of the session key by the second malicious program can be increased. In addition, it can be learned from the foregoing description of the first session key that the first device dynamically updates the session key, so that a probability of brute force cracking of the session key by the second malicious program can be further reduced.

With reference to step S106, an operation performed by the first device on the second network channel is similar to an operation performed on the first network channel. Details are not described herein again.

In addition, in some embodiments, although the first device establishes the preset quantity of network channels, if authentication on the network channel established by the normal APP succeeds, the first device may close all other network channels. This can save resources.

The following describes a network connection establishment method in this disclosure with reference to an instance.

In an example, the first device 10 is, for example, a camera, and the second device 20 is, for example, an electronic device on which a display with a relatively large size is disposed. The size of the display is, for example, 1456.4 millimeters (mm)×850.9 mm, or 1232.4 mm×717.3 mm. For ease of description, this type of electronic device is referred to as a "large screen" in this specification. A USB interface of the camera is connected to a USB interface of the large screen. A data channel between the camera and the large screen is, for example, a UVC channel. A network connection is established between the camera and the large screen by using a socket. The network channel in this embodiment is referred to as a socket channel.

In some embodiments, the camera and the large screen may be two independent electronic devices, and a connection is established between the USB interface of the camera and the USB interface of the large screen in a hot swap manner. In some other embodiments, the camera and the large screen may be two components of one electronic device, and the USB interface of the camera may be connected to the USB interface of the large screen in a fixed manner.

Figures 4, 5A:
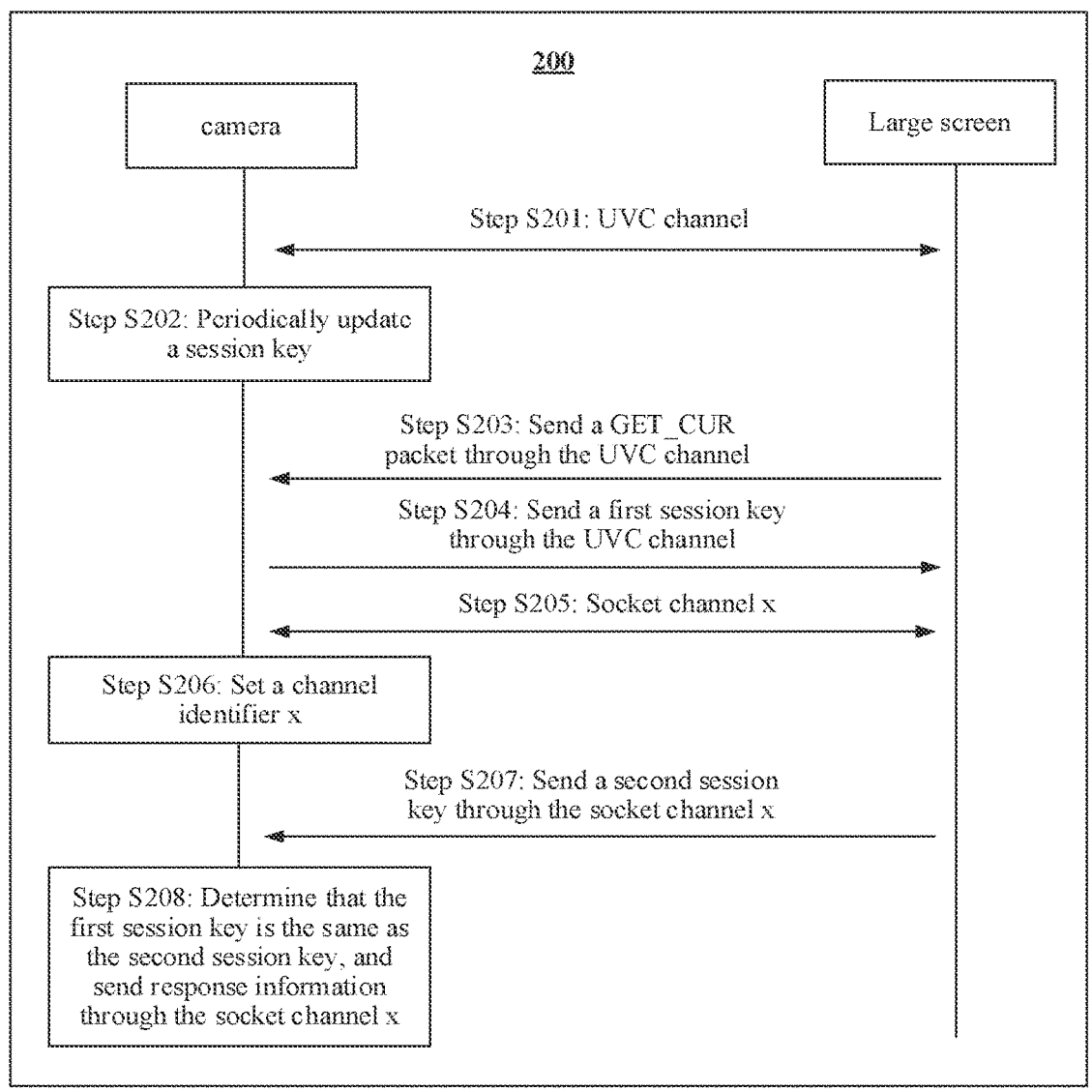
FIG. 4 is a structural diagram of an example data frame for a data packet of an obtaining request according to this disclosure.
FIG. 5A is an example signaling interaction diagram of a network connection establishment method according to this disclosure.

The data packet of the obtaining request defined in the UVC protocol is, for example, a GET_CUR packet. In this embodiment, a data frame format of the GET_CUR packet is shown in FIG. 4, and includes a data flow direction (bmRequestType) field, a request type (bRequest) field, a value (wValue) field, an index (wIndex) field, and a transmitted data length (wLenth) field. The wIndex field is usually expressed in a format of "0x000a", where "0x" in "0x000a" indicates a hexadecimal format, "00" after "0x" and adjacent to "0x" are low-order bytes in the wIndex field, the low-order bytes indicate an interface or a port, "0a" in "0x000a" are high-order bytes in the wIndex field, the high-order bytes are an EntityID, and the EntityID usually indicates a specific functional unit. For example, a value in the wIndex field is 0x0005. Correspondingly, a value of the EntityID is 05, indicating a processing unit. For another example, a value in the wIndex field is 0x0006. Correspondingly, a value of the EntityID is 06, indicating an extension unit. In actual use, a specific function is defined in the wValue field. However, the function defined in the wValue field depends on the value in the windex field. In other words, a combination of the value in the wIndex field and a value in the wValue field can clearly define a function.

Based on this, in this disclosure, related person may extend the value in the windex field, where a value of the EntityID after extension indicates an extension function unit, and further extend the value in the wValue field with reference to the extension function unit indicated by the EntityID. For example, a value in the wIndex field after extension is 0x000a. Correspondingly, a value of the EntityID is 0a, indicating an "H.264 extension function unit". Further, a value in the wValue field after extension is 0x0a, where the value "0x0a" in the wValue field indicates a function of "obtaining a session key".

In addition, an IP address and a port of the large screen end are configured for the large screen, as a socket 1 of the large screen end. Similarly, an IP address and a port of the large screen end are configured for the camera, as a socket 2 of the camera end. Then, the camera may listen to a connection request from the large screen end. After listening to the connection request from the large screen end, the camera end establishes a socket connection with the socket 1 of the large screen end by using the socket 2.

Further, the following describes the technical solutions of this disclosure with reference to different implementation scenarios.

FIG. 5A is a signaling interaction diagram of a network connection establishment method 200. The network connection establishment method 200 (referred to as the method 200 below) is, for example, an implementation process in which a first APP of a large screen end establishes a socket channel, and the first APP is a normal APP of the large screen end. The method 200 includes the following steps.

Step S201: A camera establishes a UVC channel with the large screen based on a USB connection.

The UVC channel is a channel used by the camera to transmit video data to a USB interface of the large screen through a USB interface of the camera end. For example, the camera may negotiate with the first APP of the large screen end to establish a UVC channel according to a standard UVC protocol.

Step S202: The camera periodically updates a session key.

For example, a length of the session key is 8 bytes, and a session key generated each time by a processor of the camera is different from a session key generated last time. For example, the processor of the camera may generate the session key by using a hash algorithm, then store the generated session key in a memory of the camera, and start timing. After timing expires, the processor of the camera deletes the stored session key, and generates and stores a new session key. A key update period is optional, for example, may be 5 minutes.

Step S203: The large screen sends a GET_CUR packet to the camera through the UVC channel.

For example, the first APP may send the GET_CUR packet to the camera through the UVC channel. A data frame format of the GET_CUR packet is shown in FIG. 4.

Step S204: The camera sends a first session key to the large screen through the UVC channel.

The first session key is a session key currently stored in the camera. For example, the processor of the camera may determine, based on a value "0x000a" in a wValue field and a value "0x0a" in a wIndex field, that the large screen wants to obtain a session key on the camera end. Then, the camera reads the first session key from the memory, and then adds the first session key to a container defined in the GET_CUR packet, to generate a response packet of the GET_CUR packet. Further, the processor of the camera sends the response packet to the USB interface of the large screen through the USB interface of the camera, so that the first APP obtains the first session key. In this embodiment, the first session key is a latest session key generated by the camera when the camera receives the GET_CUR packet, and the first session key is, for example, "ed 6a 45 a3 d5 6c a7 dd".

Step S205: The large screen establishes a socket channel x with the camera.

The first APP may invoke a socket 1 for connection to a socket 2 of the camera, to obtain the socket channel x. For example, the first APP may send information to the camera through the socket channel x. However, the camera does not respond to any received information before authentication on the socket channel x succeeds.

Step S206: The camera sets a channel identifier x corresponding to the socket channel x.

The channel identifier x is used to identify the socket channel x. In this embodiment, the camera may add the channel identifier x to an unauthentication list.

Step S207: The large screen sends a second session key to the camera through the socket channel x.

In this embodiment, the second session key is sent, for example, by the first APP to the camera.

Step S208: If the camera determines that the first session key is the same as the second session key, the camera sends response information to the large screen through the socket channel x.

With reference to step S204, it can be learned that if the first session key is the same as the second session key, authentication on the socket channel x succeeds, and the camera may send information to the large screen through the socket channel x. In addition, the camera may further delete the channel identifier x from the unauthentication list.

Further, in another implementation scenario, if the second session key is, for example, "aa 3b 36 c3 d5 6b a7 8e", it is clear that the second session key is different from the first session key, and it indicates that the second session key is sent by an attack program. The camera may add the corresponding channel identifier to an authentication failure list, and close the corresponding socket channel after a specific period of time. For details of an operation process in another implementation scenario, refer to descriptions in the following embodiments. The details are not described herein.

Because the UVC protocol is secure, a dynamic authentication key may be determined between the camera and the large screen by extending the UVC protocol, and the corresponding authentication key may be transmitted through the UVC channel, so that reliability of the authentication key can be ensured. Further, the camera uses the authentication key to authenticate the socket channel. It can be learned that this implementation can improve security of a mechanism for establishing the socket channel.

Figure 5B:
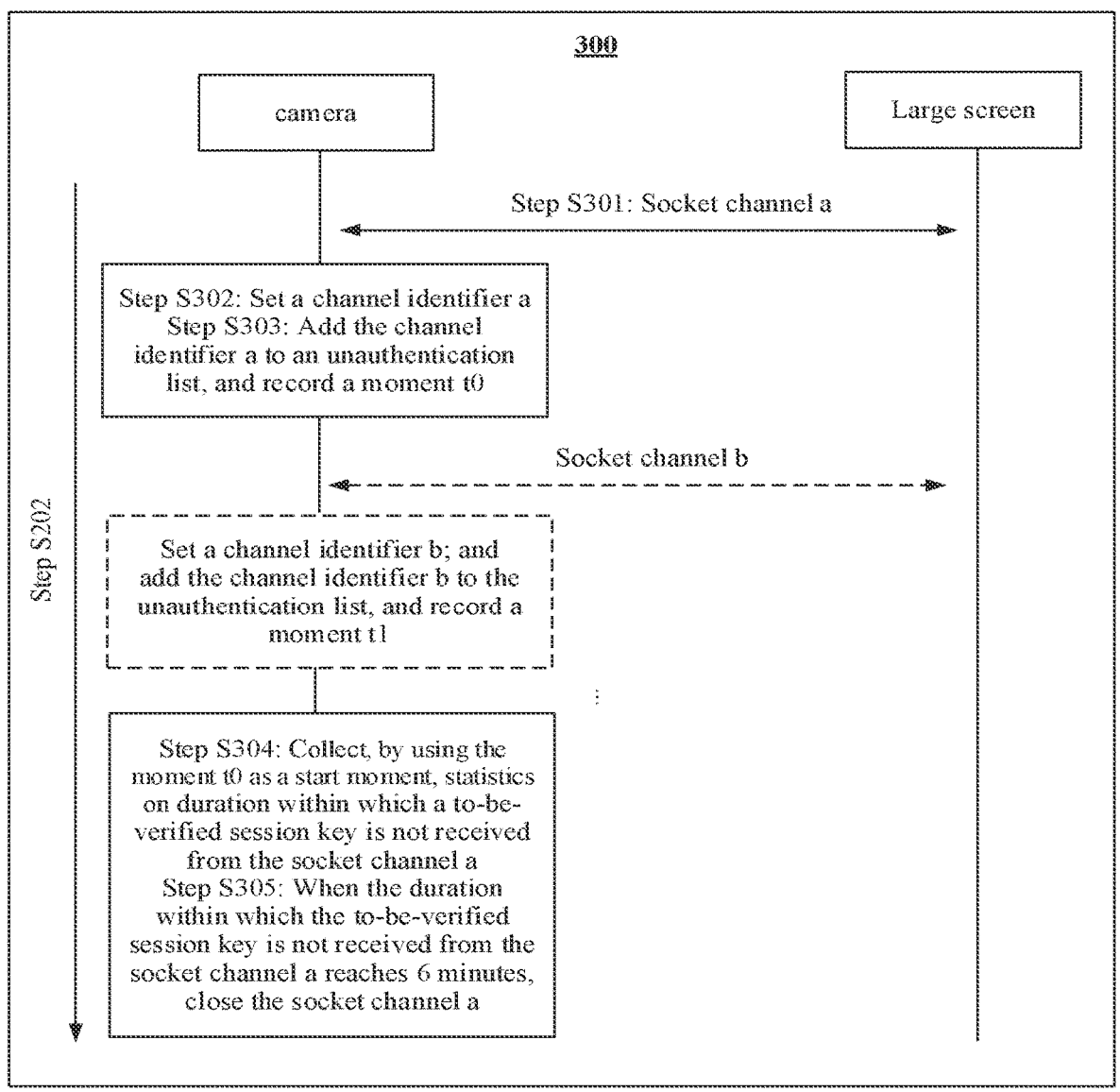
FIG. 5B is an example signaling interaction diagram of a network connection establishment method according to this disclosure.

FIG. 5B is a signaling interaction diagram of a network connection establishment method 300. The network connection establishment method 300 (referred to as the method 300 below) is, for example, an implementation process in which a first APP establishes a socket channel in a scenario in which a second APP performs a dos attack. In this embodiment, the second APP is, for example, an APP that carries a dos attack program or an APP that is on a large screen and that does not have permission to invoke a camera. The second APP cannot learn of a session key. Therefore, the second APP only continuously initiates a socket connection to the camera.

It should be understood that the second APP is merely an example described in this embodiment, and constitutes no limitation on a subject that performs a dos attack in this disclosure. In some other embodiments, the subject that performs the dos attack may alternatively be a computer program that performs a dos attack. Details are not described herein.

In an implementation process of the method 300, the camera continuously performs step S202 in the method 200. Details are not described herein again.

The method 300 further includes the following steps.

Step S301: The large screen establishes a socket channel a with the camera.

For example, establishment of the socket channel a is initiated by the second app.

Step S302: The camera sets a channel identifier a corresponding to the socket channel a.

Step S303: The camera adds the channel identifier a to an unauthentication list, and records a moment t0 at which the channel identifier a is added to the unauthentication list.

Step S304: The camera collects, by using the moment t0 as a start moment, statistics on duration within which a to-be-verified session key is not received from the socket channel a.

Step S305. When the duration within which the to-be-verified session key is not received from the socket channel a reaches 6 minutes, the camera closes the socket channel a.

The second preset duration described in the method 100 is, for example, "6 minutes" in this embodiment.

Further, after the camera closes the socket channel a, if the second APP still sends a message through the socket channel a, the second APP can receive returned data indicating that the message fails to be sent. Further, the second APP can learn that the socket channel a has been closed.

It should be noted that after step S303, the camera may further establish a socket channel b with the large screen. Then, the camera may also set a channel identifier b corresponding to the socket channel b, add the channel identifier b to the unauthentication list, and record a moment t1 at which the channel identifier a is added to the unauthentication list. In other words, an operation process of establishing the socket channel b between the camera and the large screen may be performed at the same time as the operation processes of step S304 and step S305. By analogy, after the channel identifier b is added to the unauthentication list, the camera may further establish another socket channel with the large screen. In this embodiment, for example, a total of 100 socket channels may be established between the camera and the large screen. Correspondingly, the camera may set a channel identifier corresponding to each of the 100 socket channels, further add the set channel identifier to the unauthentication list, and record a moment at which each channel identifier is written into the unauthentication list. Details are not described herein again. It should be understood that the 100 socket channels are channels for establishing connections with the socket 2.

In a possible implementation, the 100 socket channels may include, for example, a socket channel x (a socket connection initiated by the first app) established by a normal application (the first APP). Correspondingly, the remaining 99 socket channels are socket connections initiated by the second app. Based on this, for example, after 5 milliseconds (ms) after the channel identifier x is added to the unauthentication list, the camera may receive a second session key through the socket channel x, and then perform step S208. Further, in some embodiments, the camera may close all the remaining socket channels in the 100 socket channels, and delete channel identifiers of the closed socket channels.

In another possible implementation, for example, the 100 socket channels do not include a socket channel x. In other words, the 100 socket channels are all initiated by the second app. In this case, the camera may collect statistics on duration within which each of the 100 socket channels does not receive a session key, and further close the corresponding channel when the duration reaches 6 minutes. Then, the camera may establish another socket channel with the large screen.

It can be learned that, in this implementation, the camera can authenticate at least two socket channels at the same time, so that duration for authenticating a socket channel through which a dos attack is performed can be greatly shortened. Further, the camera can respond as quickly as possible to information sent through a normal socket channel, so that dos attack duration is shortened.

Figure 5C:
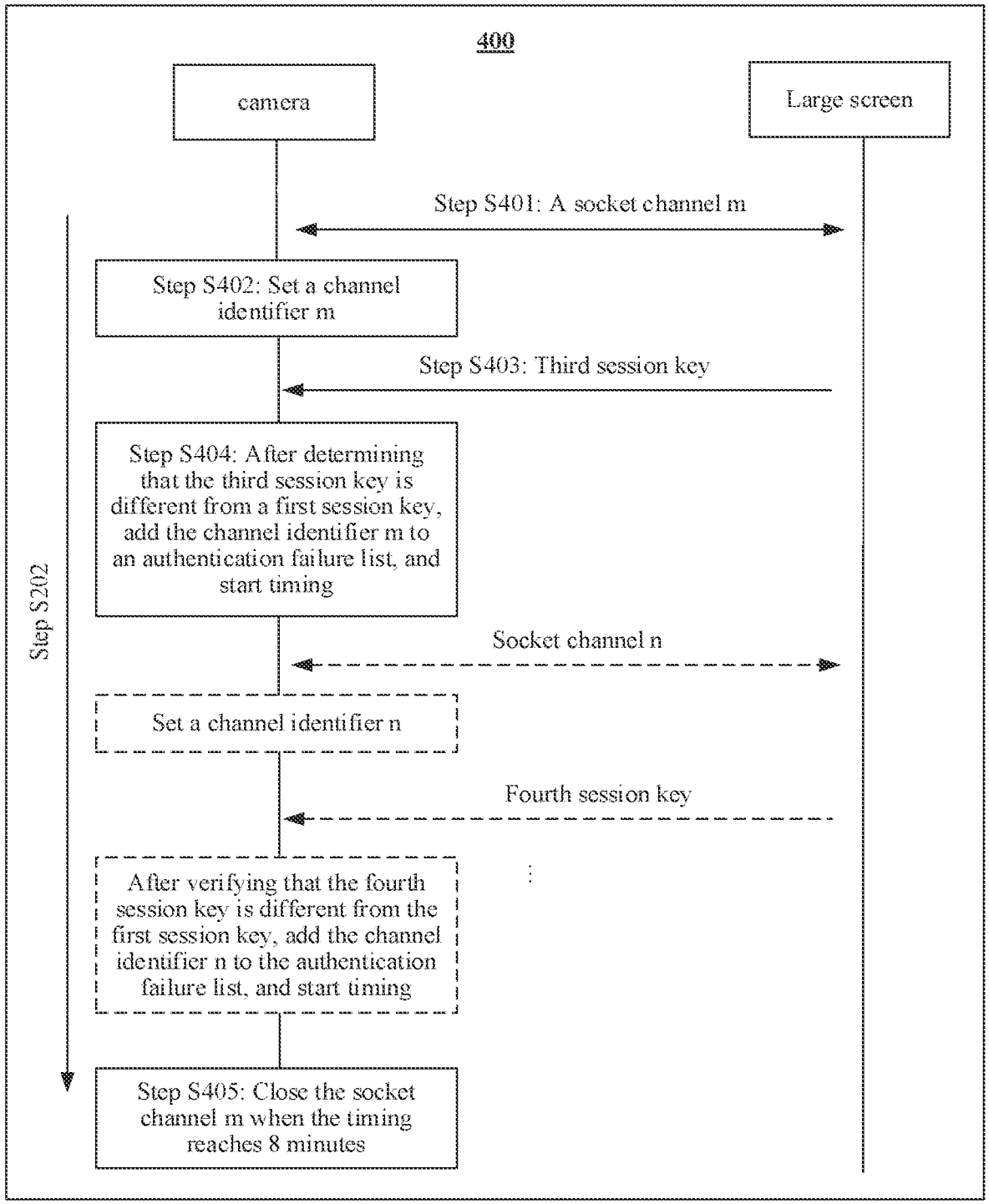
FIG. 5C is an example signaling interaction diagram of a network connection establishment method according to this disclosure.

FIG. 5C is a signaling interaction diagram of a network connection establishment method 400. The network connection establishment method 400 (referred to as the method 400 below) is, for example, an implementation process in which a first APP establishes a socket channel in a scenario in which a third APP performs brute force cracking. In this embodiment, the third APP is, for example, an APP that carries a brute force cracking program or an APP that is on a large screen and that does not have permission to invoke a first device. For example, the third APP knows that a length of a session key is 8 bytes. Further, the third APP may set a session key for each connected socket channel. For example, a length of the session key that is set by the third APP is 8 bytes, and all session keys may be arranged in ascending order.

It should be understood that the third APP is merely an example described in this embodiment, and a subject that performs brute force cracking in this disclosure is not limited. In some other embodiments, the subject that performs brute force cracking may alternatively be a computer program that performs brute force cracking. Details are not described herein.

In an implementation process of the method 400, the camera continuously performs step S202 in the method 200. Details are not described herein again.

The method 400 may include the following steps.

Step S401: The large screen establishes a socket channel m with the camera.

For example, the socket channel m is initiated by the third app.

Step S402: The large screen sets a channel identifier m corresponding to the socket channel m.

Step S403: The large screen sends a third session key to the camera through the socket channel m.

The third session key is, for example, determined by the third app.

Step S404: After determining that the third session key is different from a first session key, the camera adds the channel identifier m to an authentication failure list, and starts timing.

Step S405: When the timing reaches 8 minutes, the camera closes the socket channel m.

The third preset duration described in the method 100 is, for example, "8 minutes" in this embodiment.

Similar to the method 300, in this embodiment, after step S404, the camera may further establish a socket channel n with the large screen. Similarly, the camera may set a channel identifier n corresponding to the socket channel n, and receive a fourth session key from the socket channel n. After verifying that the fourth session key is different from the first session key, the camera adds the channel identifier n to the authentication failure list, and starts timing. By analogy, in this embodiment, for example, a total of 100 socket channels may be established between the camera and the large screen.

In a possible implementation, the 100 socket channels may include, for example, a socket channel x. Further, after the camera performs step S208, the camera may close all 99 socket channels in the 100 socket channels other than the socket channel x, and delete channel identifiers of the 99 closed socket channels. In another possible implementation, all the 100 socket channels are socket channels used for brute force cracking, and an operation process performed by the camera on each of the 100 socket channels is similar to an operation process performed on the socket channel m.

Then, the camera may establish another socket channel with the large screen. Details are not described again in this disclosure.

It can be learned that in this embodiment, the camera closes a connection to an established socket channel only after authentication on the corresponding socket channel fails for a period of time. Correspondingly, the third APP can learn that an attack by using a session key corresponding to the corresponding socket channel fails after the period of time. Then, the third APP uses another session key to initiate a next attack, so that attack costs of the third APP are increased. In addition, the camera generates a new session key at an interval of a period of time, so that a probability of generating a correct session key by the third APP can be further reduced.

The embodiments shown in FIG. 5A to FIG. 5C are described by using a single scenario as an example. In an actual operation, a socket channel established between the camera and the large screen may be any channel described in FIG. 5A to FIG. 5C. Further, the camera may perform an operation on each socket channel by using an appropriate method in FIG. 5A to FIG. 5C.

Figure 5D:
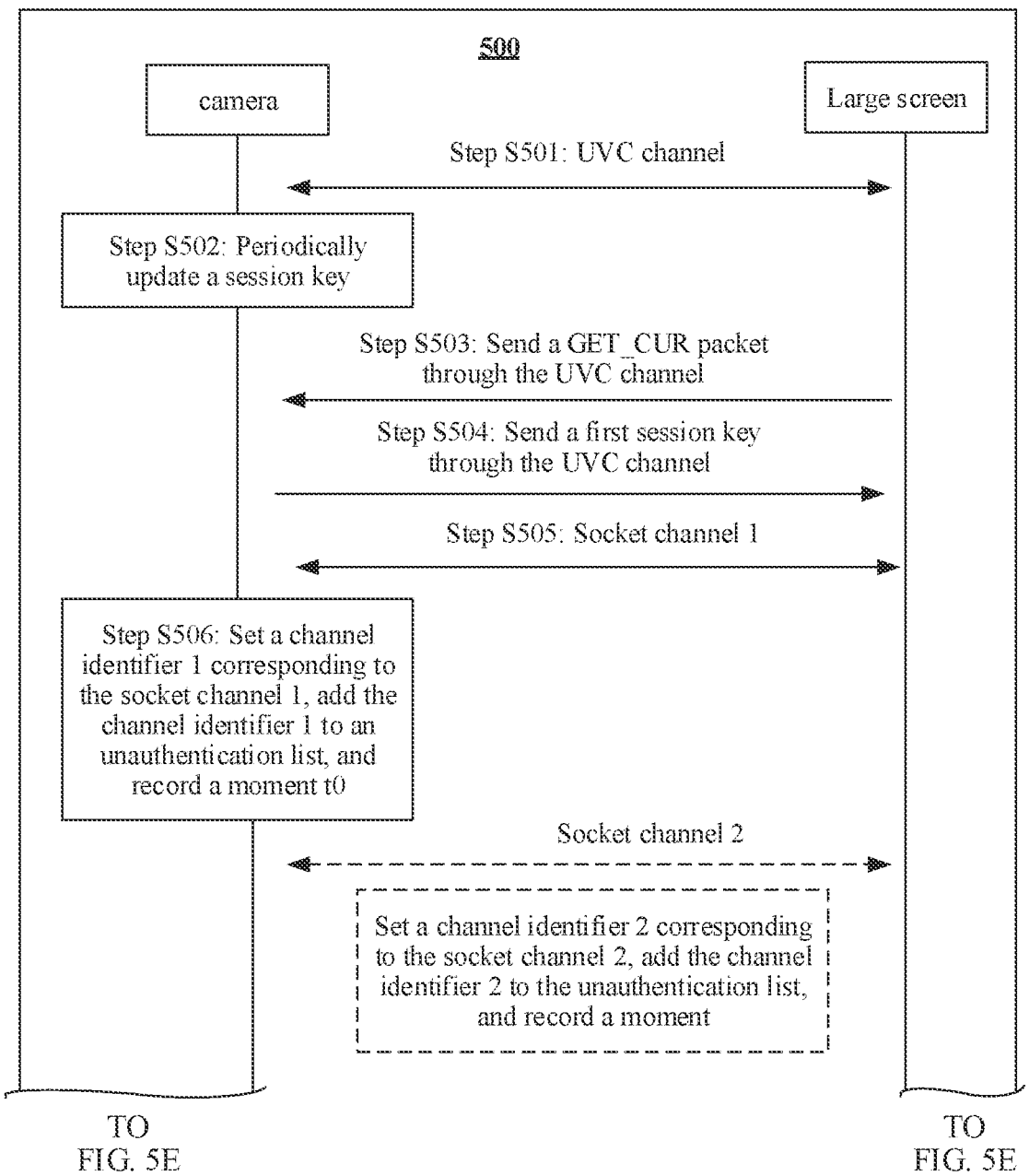
FIG. 5D and FIG. 5E are an example signaling interaction diagram of a network connection establishment method according to this disclosure.
Figure 5E:
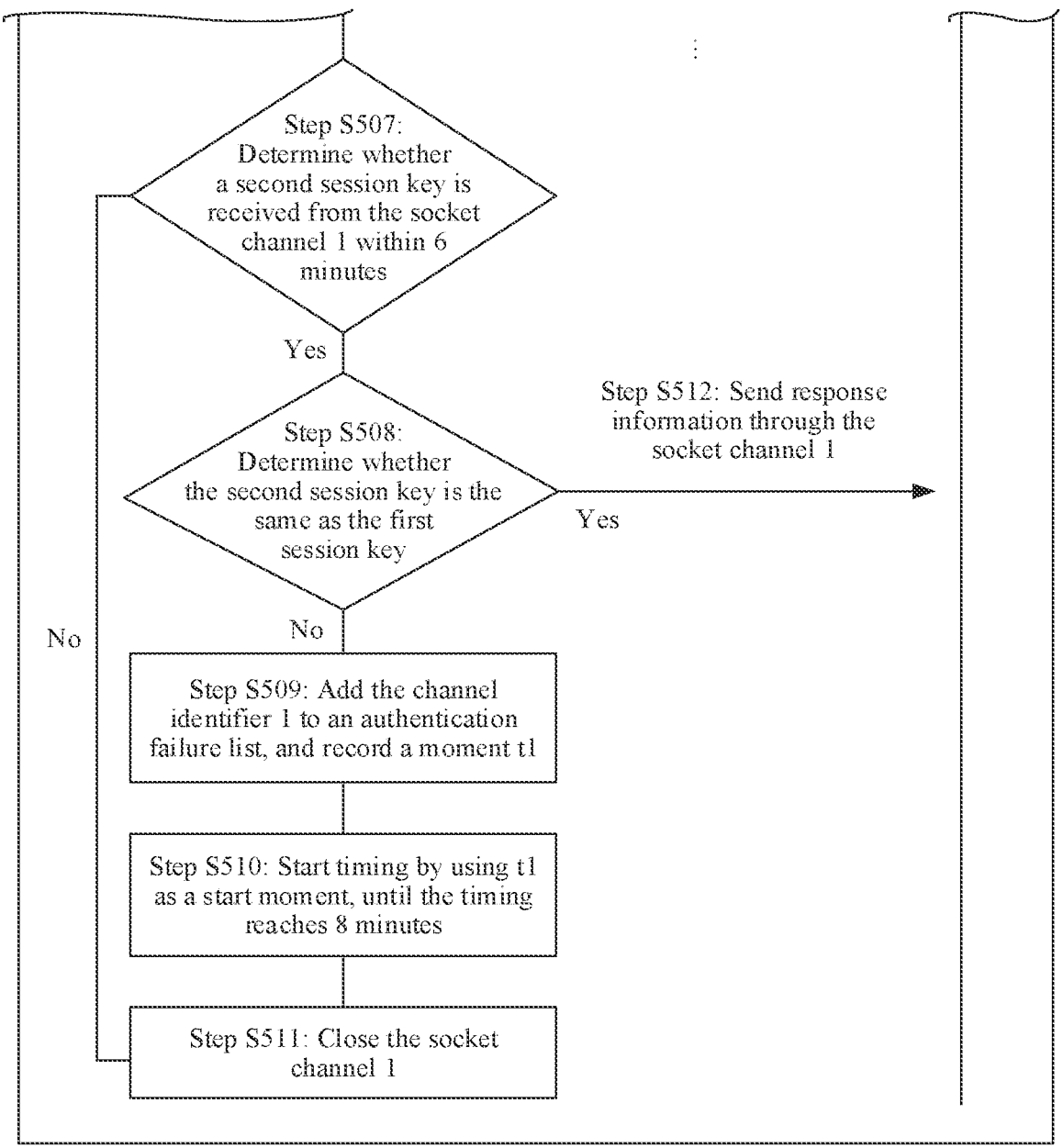

FIG. 5D and FIG. 5E are a signaling interaction diagram of a network connection establishment method 500. The network connection establishment method 500 (referred to as the method 500 below) is an example of a complete implementation process in this disclosure. The method 500 includes the following steps.

Step S501; A camera establishes a UVC channel with a large screen based on a USB connection.

Step S502: The camera periodically updates a session key.

Step S503: The large screen sends a GET_CUR packet to the camera through the UVC channel.

Step S504. The camera sends a first session key to the large screen through the UVC channel.

Step S505: The large screen establishes a socket channel 1 with the camera.

Step S506: The camera sets a channel identifier 1 corresponding to the socket channel 1, adds the channel identifier 1 to an unauthentication list, and records a moment t0.

In actual implementation, after step S506, the camera may further establish a socket channel 2 with the large screen, set a channel identifier 2 corresponding to the socket channel 2, add the channel identifier 2 to the unauthentication list, and record an addition moment. Then, the camera may continue to establish a socket channel 3 with the large screen, and so on. Details are not described herein again.

Step S507: The camera determines, by using t0 as a start moment, whether a second session key is received from the socket channel 1 within 6 minutes. If the second session key is received from the socket channel 1, the camera performs step S508. If the second session key is not received from the socket channel 1, the camera performs step S511.

It should be noted that, if the socket channel 1 is initiated by a normal APP on the large screen, or the socket channel 1 is initiated by an APP that is on the large screen and that has permission to invoke the camera, the large screen sends the second session key within specific time (6 minutes). In this case, step S508 is performed. If the socket channel 1 is initiated by a malicious APP that carries a brute force cracking program, the large screen also sends the second session key within the specific time. In this case, step S508 is also performed. If the socket channel 1 is initiated by a malicious APP that carries a dos attack program or an APP that is on the large screen but does not have permission to invoke the camera, the large screen does not send the session key within the specific time. In this case, step S511 is performed.

Step S508: The camera determines whether the second session key is the same as the first session key. If the second session key is the same as the first session key, the camera performs step S512. If the second session key is not the same as the first session key, the camera performs step S509.

It should be noted that, if the socket channel 1 is initiated by a normal APP on the large screen, or the socket channel 1 is initiated by an APP that is on the large screen and that has permission to invoke the camera, the second session key sent by the large screen is the same as the first session key. In this case, step S512 is performed. If the socket channel 1 is initiated by a malicious APP that carries a brute force cracking program, the second session key sent by the large screen is different from the first session key. In this case, step S509 is performed.

Step S509: The camera adds the channel identifier 1 to an authentication failure list, and records a moment t1.

Step S510: The camera starts timing by using t1 as a start moment, and performs step S511 after the timing reaches 8 minutes.

Step S511: The camera closes the socket channel 1.

Step S512: The camera sends response information to the large screen through the socket channel 1.

The method 500 is a complete implementation process in which a network connection is established in this disclosure. For parts in the method 500 that are the same as those in the method 200, the method 300, and the method 400, refer to corresponding descriptions in the method 200, the method 300, and the method 400. In addition, in the implementation process of the method 500, two determining results corresponding to each of the two determining steps may correspond to operation manners in different implementation scenarios, and an implementation in each implementation scenario belongs to the embodiment corresponding to the method 200, the method 300, or the method 400. Details are not described herein again.

It may be understood that FIG. 4 to FIG. 5D and FIG. 5E show examples for description, and constitute no limitation on the technical solutions of this disclosure. In some other embodiments, the first session key shown in FIG. 5A to FIG. 5D and FIG. 5E may be a key with another length, the duration described in FIG. 5A to FIG. 5D and FIG. 5E may be adaptively adjusted according to a requirement, and a quantity of channel identifiers in each list described in FIG. 5A to FIG. 5D and FIG. 5E may also be flexibly set. Details are not described herein. In addition, this specification does not show all implementation scenarios applicable to this disclosure. In another implementation scenario, other implementation means based on the technical ideas of this disclosure should also fall within the protection scope of this disclosure.

In conclusion, in this implementation, the first device transmits the pre-generated session key to the normal APP through the data channel, so that reliability of the pre-generated session key can be ensured. Then, the first device authenticates a network channel by detecting whether a session key transmitted on the network channel is the same as the pre-generated session key, and transmits information through the network channel after authentication succeeds, so that security of a mechanism for establishing the network channel can be improved. In addition, the first device can increase attack costs by delaying a time for closing a network channel through which an attack is performed, and further shorten a time for successfully authenticating and using a network channel for a normal app.

The foregoing embodiments describe solutions of the network connection establishment method provided in this disclosure from perspectives of a hardware structure and a software architecture of the first device, and actions performed by software and hardware. A person skilled in the art should be easily aware that, with reference to the embodiments disclosed in this specification, the processing steps of generating a session key, authenticating a network channel, maintaining each list, and the like can be implemented not only in a form of hardware or a combination of hardware and computer software in this disclosure. Whether a function is performed by hardware or hardware driven by computer software depends on a particular disclosure and a design constraint of the technical solutions. A person skilled in the art may use different methods to implement the described functions for each particular application, but it should not be considered that the implementation goes beyond the scope of the embodiments of this disclosure.

For example, the first device 10 may implement the foregoing corresponding functions in a form of a function module. In some embodiments, the electronic device may include a transceiver module and a processing module. The transceiver module may be configured to perform receiving and sending operations of the first device and the camera in any embodiment shown in FIG. 3 to FIG. 5D and FIG. 5E. The processing module may be configured to perform operations other than the receiving and sending operations of the first device and the camera in any embodiment shown in FIG. 3 to FIG. 5D and FIG. 5E. For specific content, refer to the descriptions related to the first device in the embodiments corresponding to FIG. 3 to FIG. 5D and FIG. 5E. Details are not described herein again.

Figure 6A:
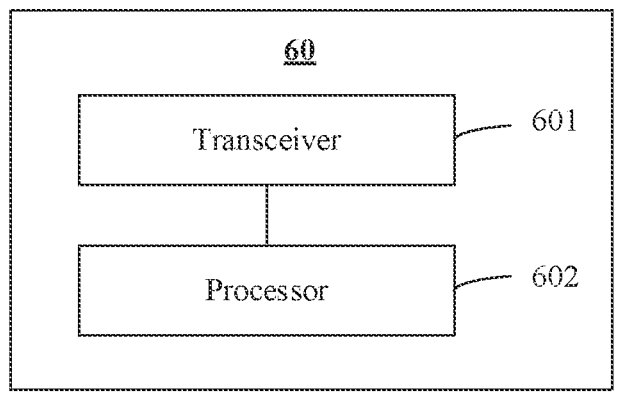
FIG. 6A is a schematic diagram of an example of a structure of an electronic device according to this disclosure.

It may be understood that division of the foregoing modules is merely logical function division. During actual implementation, a function of the transceiver module may be integrated into a transceiver for implementation, and a function of the processing module may be integrated into a processor for implementation. As shown in FIG. 6A, an electronic device 60 includes a transceiver 601 and a processor 602. The transceiver 601 may perform operations other than receiving and sending of the first device and the camera in any embodiment shown in FIG. 3 to FIG. 5D and FIG. 5E. The transceiver 601 is further configured to establish, by using an interface, a channel with the second device and the large screen shown in FIG. 3 to FIG. 5D and FIG. 5E. The transceiver 601 establishes a channel with the second device and the large screen, for example, by using a USB interface. The processor 602 may be configured to perform operations other than receiving and sending operations of the first device and the camera in any embodiment shown in FIG. 3 to FIG. 5D and FIG. 5E.

For example, the transceiver 601 may be configured to establish a data channel with a second device. The processor 602 may be configured to update a session key based on a preset period. The transceiver 601 may be further configured to receive an obtaining request from the second device through the data channel, and send the first session key to the second device through the data channel in response to the obtaining request, where the first session key is a latest session key obtained when the first device receives the obtaining request, and establish a first network channel with the second device. The processor 602 may be further configured to, after a second session key is received through the first network channel within first preset duration, detect whether the second session key is the same as the first session key, and when the second session key is the same as the first session key, send response information to the second device through the first network channel, where the response information is information that the first device responds to a request sent by the second device through the first network channel.

For specific content, refer to descriptions related to the first device and the camera in the embodiments corresponding to FIG. 3 to FIG. 5D and FIG. 5E. Details are not described herein again.

Figure 6B:
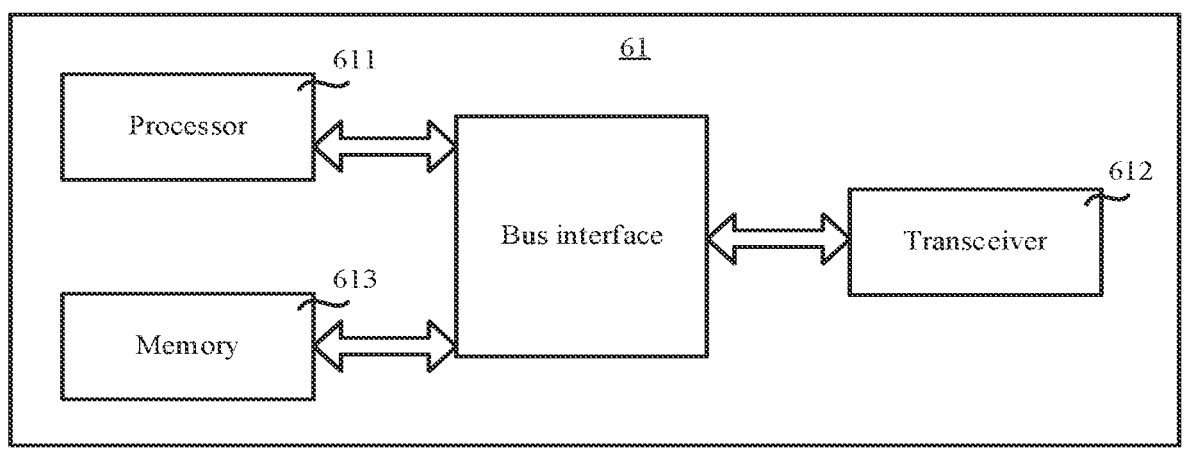
FIG. 6B is a schematic diagram of an example of a structure of an electronic device according to this disclosure.

FIG. 6A describes the electronic device in this disclosure from a perspective of an independent function entity. In another implementation scenario, function entities that run independently may be integrated into one hardware entity, for example, a chip. Correspondingly, as shown in FIG. 6B, in this implementation scenario, an electronic device 61 may include a processor 611, a transceiver 612, and a memory 613. The memory 613 may be configured to store a program/code pre-installed on the electronic device 61, or may store code or the like used for execution by the processor 611.

It should be understood that the electronic device 61 in this disclosure may correspond to the first device and the camera in the embodiments corresponding to FIG. 3 to FIG. 5D and FIG. 5E in this disclosure. The transceiver 612 is configured to perform receiving and sending of information and data in any embodiment shown in FIG. 3 to FIG. 5D and FIG. 5E. The processor 611 is configured to perform other processing of the first device and the camera in any embodiment shown in FIG. 3 to FIG. 5D and FIG. 5E except receiving and sending of information and data. Details are not described herein again.

For specific content, refer to descriptions related to the first device and the camera in the embodiments corresponding to FIG. 3 to FIG. 5D and FIG. 5E. Details are not described herein again.

In specific implementation, corresponding to an electronic device, this disclosure further provides a computer storage medium. A computer storage medium disposed in any device may store a program. When the program is executed, some or all of the steps in the embodiments including the network connection establishment method provided in FIG. 3 to 5D may be implemented. The storage medium in any device may be a magnetic disk, an optical disc, a read-only memory (ROM), a RAM, or the like.

In this disclosure, the transceiver may be a wired transceiver. The wired transceiver may be, for example, a USB interface. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The memory may include a volatile memory, for example, a RAM, the memory may also include a non-volatile memory, for example, a ROM, a flash memory, a hard disk drive (HDD), or a solid-state drive (SSD), or the memory may further include a combination of the foregoing types of memories.

A bus interface may further be included in FIG. 6B, and the bus interface may include any quantity of interconnecting buses and bridges, and connect together various circuits of one or more processors represented by the processor and a memory represented by the memory. The bus interface may further link together various other circuits such as a peripheral device, a voltage regulator, and a power management circuit. This is well known in the art, and therefore is not further described in this specification. A bus interface provides an interface. The transceiver provides a unit configured to communicate with various other devices on a transmission medium. The processor is responsible for managing a bus architecture and normal processing. The memory may store data used when the processor is performing an operation.

A person skilled in the art may further understand that various illustrative logical blocks and steps that are listed in the embodiments of this disclosure may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this disclosure.

The various illustrative logical units and circuits described in the embodiments of this disclosure may implement or operate the described functions through a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this disclosure may be directly embedded into hardware, a software unit executed by a processor, or a combination thereof. The software unit may be stored in a RAM, a flash memory, a ROM, an erasable programmable ROM (EPROM), an electrically EPROM (EEPROM), a register, a hard disk, a removable magnetic disk, a compact disc (CD) ROM (CD-ROM), or a storage medium of any other form in the art. For example, the storage medium may be connected to a processor, so that the processor can read information from the storage medium and write information to the storage medium. Optionally, the storage medium may alternatively be integrated into the processor. The processor and the storage medium may be disposed in an ASIC, and the ASIC may be disposed in a user equipment (UE). Optionally, the processor and the storage medium may alternatively be disposed in different components of the UE.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of the embodiments.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, the procedures or functions according to this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or packet center to another website, computer, server, or packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a packet storage device, such as a server or a packet center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid state disk (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to partial descriptions in the method embodiment.

Although some embodiments of this disclosure have been described, persons skilled in the art can make changes and modifications to these embodiments once they learn of the basic concept. Therefore, the following claims are intended to be construed as to cover the embodiments and all changes and modifications falling within the scope of this disclosure.

It is clear that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A method implemented by a first device, wherein the method comprises:
    establishing a data channel with a second device;
    updating a current session key based on a preset period;
    receiving an obtaining request from the second device through the data channel;
    sending, in response to the obtaining request, a first session key to the second device through the data channel, wherein the first session key is the current session key at the time the first device receives the obtaining request;
    establishing a first network channel with the second device;
    identifying whether a second session key is received through the first network channel within a first preset duration;
    when the second session key is received within the first duration, detecting whether the second session key is the same as the first session key;
    sending response information to the second device through the first network channel when the second session key is the same as the first session key and responsive to a request from the second device; and
    closing the first network channel when the second session key is not received within the first preset duration.

2. The method of claim 1, wherein after detecting whether the second session key is the same as the first session key, the method further comprises closing the first network channel after a second preset duration when the second session key is different from the first session key.

3. The method of claim 2, further comprising:
when the second session key is different from the first session key:
adding a first channel identifier to an authentication failure list, wherein the authentication failure list stores a channel identifier of a network channel that fails to be authenticated;
recording a second addition moment; and
closing the first network channel when a duration for which the second addition moment is used as a start moment reaches the second preset duration.

4. The method of claim 1, wherein after establishing the first network channel, the method further comprises:
setting a first channel identifier identifying the first network channel;
adding the first channel identifier to an unauthentication list, wherein the unauthentication list stores a channel identifier of an unauthenticated network channel;
recording a first addition moment; and
detecting whether the second session key is received within the first preset duration for which the first addition moment is used as a start moment.

5. The method of claim 4, wherein after adding the first channel identifier to the unauthentication list, the method further comprises establishing a second network channel with the second device.

6. The method of claim 1, wherein after receiving the obtaining request, the method further comprises:
obtaining an index (wIndex) field and a value (wValue) field that are in a packet of the obtaining request, wherein the wIndex field comprises an entity identifier (EntityID) byte; and
determining, based on a first value of the EntityID byte and a second value in the wValue field, that the obtaining request obtains a third session key.

7. A first device comprising:
a transceiver configured to;
establish a data channel with a second device;
receive an obtaining request from the second device through the data channel;
send a first session key to the second device through the data channel in response to the obtaining request, wherein the first session key is a current session key;
establish a first network channel with the second device; and
identify whether a second session key is received through the first network channel within a first preset duration; and
a processor coupled to the transceiver and configured to:
update the current session key based on a preset period;
when the second session key is within the first preset duration, detect whether the second session key is the same as the first session key;
send response information to the second device through the first network channel when the second session key is the same as the first session key and responsive to a request from the second device; and
close the first network channel when the second session key is not received within the first preset duration.

8. The first device of claim 7, wherein the processor is further configured to close the first network channel after a second preset duration when the second session key is different from the first session key.

9. The first device of claim 8, wherein the processor is further configured to:
when the second session key is different from the first session key:
add the first channel identifier to an authentication failure list, wherein the authentication failure list stores a channel identifier of a network channel that fails to be authenticated;
record a second addition moment; and
close the first network channel when a duration for which the second addition moment is used as a start moment reaches the second preset duration.

10. The first device of claim 9, wherein the transceiver is further configured to establish a second network channel with the second device.

11. The first device of claim 9, wherein a physical port for the first network channel is the same as a physical port for the data channel.

12. The first device of claim 9, wherein the data channel is a USB channel, and wherein the first network channel is a socket channel.

13. The first device of claim 7, wherein the processor is further configured to:
set a first channel identifier identifying the first network channel;
add the first channel identifier to an unauthentication list, wherein the unauthentication list stores a channel identifier of an unauthenticated network channel;
record a first addition moment; and
detect whether the second session key is received within the first preset duration for which the first addition moment is used as a start moment.

14. The first device of claim 7, wherein the processor is further configured to:
obtain an index (wIndex) field and a value (wValue) field that are in a packet of the obtaining request, wherein the wIndex field comprises an entity identifier (EntityID) byte; and
determine, based on a first value of the EntityID byte and a second value in the wValue field, that the obtaining request obtains a third session key.

15. A computer program product comprising instructions stored on a non-transitory computer-readable medium that, when executed by a processor, cause a first device to:
establish a data channel with a second device;
update a current session key based on a preset period;
receive an obtaining request from the second device through the data channel;
send, in response to the obtaining request, a first session key to the second device through the data channel, wherein the first session key is the current session key at the time the first device receives the obtaining request;
establish a first network channel with the second device;
identify whether a second session key is received through the first network channel within a first preset duration;
when the second session key is received within a first preset duration, detect whether the second session key is the same as the first session key;
send response information to the second device through the first network channel when the second session key is the same as the first session key and responsive to a request from the second device; and
close the first network channel when the second session key is not received within the first preset duration.

16. The computer program product of claim 15, wherein after detecting whether the second session key is the same as the first session key, the instructions further cause the first device to close the first network channel after a second preset duration when the second session key is different from the first session key.

17. The computer program product of claim 16, wherein when the second session key is different from the first session key, the instructions further cause the first device to:
- add a first channel identifier to an authentication failure list, wherein the authentication failure list stores a channel identifier of a network channel that fails to be authenticated;
- record a second addition moment; and
- close the first network channel when a duration for which the second addition moment is used as a start moment reaches the second preset duration.

18. The computer program product of claim 15, wherein after establishing the first network channel, the instructions further cause the first device to:
- set a first channel identifier identifying the first network channel;
- add the first channel identifier to an unauthentication list, wherein the unauthentication list stores a channel identifier of an unauthenticated network channel;
- record a first addition moment; and
- detect whether the second session key is received within the first preset duration for which the first addition moment is used as a start moment.

19. The computer program product of claim 18, wherein after adding the first channel identifier to the unauthentication list, the instructions further cause the first device to establish a second network channel with the second device.

20. The computer program product of claim 15, wherein after receiving the obtaining request, the instructions further cause the first device to:
- obtain an index (wIndex) field and a value (wValue) field that are in a packet of the obtaining request, wherein the wIndex field comprises an entity identifier (EntityID) byte; and
- determine, based on a first value of the EntityID byte and a second value in the wValue field, that the obtaining request obtains a third session key.

* * * * *